US008745228B2

(12) United States Patent
Beckert et al.

(10) Patent No.: US 8,745,228 B2
(45) Date of Patent: Jun. 3, 2014

(54) MATCHING DEVICE CAPABILITIES AND CONTENT CHARACTERISTICS

(75) Inventors: Joerg Beckert, San Francisco, CA (US); Mikko Hypponen, San Francisco, CA (US); Tuomas Dahlgren, Espoo (FI)

(73) Assignee: Adobe Systems Incorporated, San Jose, CA (US)

( * ) Notice: Subject to any disclaimer, the term of this patent is extended or adjusted under 35 U.S.C. 154(b) by 396 days.

(21) Appl. No.: 11/966,566

(22) Filed: Dec. 28, 2007

(65) Prior Publication Data
US 2014/0040445 A1 Feb. 6, 2014

Related U.S. Application Data

(60) Provisional application No. 60/990,282, filed on Nov. 26, 2007.

(51) Int. Cl.
*G06F 15/173* (2006.01)
(52) U.S. Cl.
USPC ........... 709/226; 709/246; 715/734; 715/735; 715/736; 715/737
(58) Field of Classification Search
USPC .................. 709/206, 246, 226; 715/744–747, 715/734–737
See application file for complete search history.

(56) References Cited

U.S. PATENT DOCUMENTS

| | | | |
|---|---|---|---|
| 6,430,624 B1 * | 8/2002 | Jamtgaard et al. | 709/246 |
| 6,589,291 B1 | 7/2003 | Boag et al. | |
| 6,687,745 B1 | 2/2004 | Franco et al. | |
| 7,027,801 B1 | 4/2006 | Hall et al. | |
| 7,155,681 B2 | 12/2006 | Mansour et al. | |
| 7,284,046 B1 * | 10/2007 | Kreiner et al. | 709/223 |
| 7,343,317 B2 | 3/2008 | Jokinen et al. | |
| 7,478,170 B2 * | 1/2009 | Ong et al. | 709/246 |
| 7,516,045 B2 * | 4/2009 | Butler | 702/183 |
| 7,567,575 B2 | 7/2009 | Chen et al. | |
| 7,603,106 B2 | 10/2009 | Aaltonen et al. | |
| 7,974,988 B2 * | 7/2011 | Nandiwada et al. | 707/791 |
| 8,312,521 B2 * | 11/2012 | Isobe et al. | 726/7 |
| 2002/0002705 A1 | 1/2002 | Byrnes et al. | |
| 2002/0032754 A1 | 3/2002 | Logston et al. | |
| 2002/0069263 A1 | 6/2002 | Sears et al. | |
| 2003/0135563 A1 * | 7/2003 | Bodin et al. | 709/206 |
| 2004/0024867 A1 * | 2/2004 | Kjellberg | 709/224 |
| 2004/0098669 A1 | 5/2004 | Sauvage et al. | |
| 2006/0212621 A1 | 9/2006 | Ash et al. | |

(Continued)

OTHER PUBLICATIONS

Chanda, "Embedded Document within an Application", Pending U.S. Appl. No. 11/567,111, filed Dec. 5, 2006, 24 pages.

(Continued)

*Primary Examiner* — Duyen Doan
(74) *Attorney, Agent, or Firm* — Schwegman Lundberg & Woessner, P.A.

(57) ABSTRACT

A computer-implemented method includes determining if one or more electronic device capabilities represented in one of a group of device profiles is associated with one or more content characteristics represented in one of a group of resource profiles. The method also includes assigning the device profile to the resource profile if the electronic device capabilities are associated with the content characteristics. Furthermore, the method includes, upon receipt of content defined by the resource profile, initiating delivery of the content to at least one electronic device associated with the one device profile based upon the assignment.

23 Claims, 10 Drawing Sheets

(56) References Cited

U.S. PATENT DOCUMENTS

| | | |
|---|---|---|
| 2007/0002840 A1* | 1/2007 | Song et al. .................. 370/352 |
| 2007/0100989 A1* | 5/2007 | Papatla ....................... 709/224 |
| 2007/0121882 A1* | 5/2007 | Timmins et al. ......... 379/218.01 |
| 2007/0130331 A1 | 6/2007 | Kao et al. |
| 2007/0204300 A1 | 8/2007 | Markley et al. |
| 2007/0204311 A1 | 8/2007 | Hasek et al. |
| 2007/0204314 A1 | 8/2007 | Hasek et al. |
| 2008/0125117 A1* | 5/2008 | Jiang ........................... 455/433 |
| 2008/0195664 A1 | 8/2008 | Maharajh et al. |
| 2008/0201225 A1 | 8/2008 | Maharajh et al. |
| 2008/0201748 A1 | 8/2008 | Hasek et al. |
| 2008/0220759 A1 | 9/2008 | Norman |
| 2008/0243998 A1 | 10/2008 | Oh et al. |
| 2008/0274739 A1 | 11/2008 | Wu |
| 2008/0311936 A1 | 12/2008 | Lovell |
| 2009/0061863 A1* | 3/2009 | Huggett et al. ............... 455/434 |
| 2009/0198653 A1 | 8/2009 | Christianson |
| 2009/0313645 A1 | 12/2009 | Sathish et al. |

OTHER PUBLICATIONS

Hosmer, et al., "System and Method for Developing Information for a Wireless Information System", Pending U.S. Appl. No. 10/791,299, filed Mar. 1, 2004, 26 pages.

Morris, et al., "Mobile Rich Media Information System", Pending U.S. Appl. No. 10/791,298, filed Mar. 1, 2004, 43 pages.

Qualcomm Incorporated, "Binary Runtime Environment for Wireless", May 8, 2003, 43 pages.

Rodgers, et al. "Bandwidth Management System", Pending U.S. Appl. No. 10/791,311, filed Mar. 1, 2004, 27 pages.

Wireless Application Protocol Forum, Ltd. "WAG UAProf", Wireless Application Protocol, WAP-248-UAPROF-20011020-a, Version Oct. 20, 2001, 86 pages.

World Wide Web Consortium (W3C). "Composite Capability/Preference Profiles (CC/PP): Structure and Vocabularies 2.0", W3C Working Draft, Apr. 30, 2007, 46 pages.

* cited by examiner

426 {
Device profile *Device1*: capabilities swfversion=7,8; locale=en-US, fi-FI
Content profile *ContentProfile1*: capabilities swfversion=8; locale=fi-FI
Content profile *ContentProfile2*: capabilities swfversion=8; locale=en-US
Content profile *ContentProfile3*: capabilities swfversion=9; locale=fi-FI
}

428 {
locale=en-US##swfversion=7
locale=fi-FI##swfversion=7
locale=en-US##swfversion=8
locale=fi-FI##swfversion=8
}

430 {
Case 1 (match is found): Content is available for profiles *ContentProfile1* and *ContentProfile2* following lookup will happen.
1) is there a content profile for key locale=en-US##swfversion=7 -> no, go to next key
2) is there a content profile for key locale=fi-FI##swfversion=7 -> no, go to next key
3) is there a content profile for key locale=en-US##swfversion=8 -> yes. Use content associated with *ContentProfile2*.
}

432 {
Case 2 (match not found): Content is available for profile *ContentProfile3* following lookup will happen.
1) is there content profile for key locale=en-US##swfversion=7 -> no, go to next key
2) is there content profile for key locale=fi-FI##swfversion=7 -> no, go to next key
3) is there content profile for key locale=en-US##swfversion=8 -> no, go to next key
4) is there content profile for key locale=fi-FI##swfversion=8 -> no, go to next key
5) No more keys -> there is no content set for this device
}

FIG. 4B

MATCHING DEVICE CAPABILITIES AND CONTENT CHARACTERISTICS

CROSS REFERENCE TO RELATED APPLICATIONS

This application claims priority to U.S. Provisional Application No. 60/990,282, filed Nov. 26, 2007.

BACKGROUND

The present disclosure relates to associating device capabilities with content characteristics for exchanging data.

Electronic devices such as cellular telephones and personal digital assistants (PDAs) may be used to collect, exchange and present various types of content such as multimedia content. For example, along with placing and receiving telephone calls, cellular telephones may also exchange data such as text, images, video, and electronic mail (email) messages. Such electronic devices are produced by numerous manufacturers and commonly offer a variety of different capabilities. For example, display screens with different resolution levels and audio decoders implementing different decoding schemes may be incorporated into the cellular telephones. As such, different types of images and audio content may be received, processed and presented based upon the capabilities of the cellular telephone receiving the content. However, devices lacking appropriate capabilities may be unable to process and present content, for example, sent from another device or a service provider with the proper capabilities.

SUMMARY

The present disclosure relates to associating device capabilities with content characteristics for exchanging data. By matching such capabilities and characteristics, appropriate content may be efficiently provided for processing by a device.

In general, one aspect of the subject matter described in the specification can be embodied in a computer-implemented method that includes determining if one or more electronic device capabilities represented in one of a group of device profiles is associated with one or more content characteristics represented in one of a group of resource profiles. The method also includes assigning the device profile to the resource profile if the electronic device capabilities are associated with the content characteristics. Furthermore, the method includes, upon receipt of content defined by the resource profile, initiating delivery of the content to at least one electronic device associated with the one device profile based upon the assignment. Other implementations of this aspect include corresponding systems, apparatus, and computer program products.

These and other embodiments can optionally include one or more of the following features. Determining if one or more electronic device capabilities is associated with one or more content characteristics may occur upon receipt of content. The computer-implemented method may further include storing data that represents the assignment of the device profile and the resource profile. The computer-implemented method may also include using the stored data to initiate content delivery, updating the stored data to adjust the assignment, and/or deleting the stored data to remove the assignment.

Determining if an electronic device capability is associated to a content characteristic may include determining if the content characteristic is compatible with the electronic device capability. Various content characteristics and electronic device capabilities may be utilized. For example, the electronic device capability may includes a video, audio or communication capabilities.

Particular embodiments of the subject matter described in this specification can be implemented to realize one or more of the following advantages. Device and content types may be paired based upon capabilities of the devices and characteristics of the content. As such, content may be efficiently directed and delivered to devices capable of processing the content, thereby conserving device processing time, transmission bandwidth and storage space. Furthermore, by forming device and content associations based upon device capabilities and content characteristics, device upgrades and content changes may be accounted for without requesting comparative information from other devices and content sources.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 4A-B illustrate exemplary device profiles and profile matching demonstrations.

Like reference numbers and designations in the various drawings indicate like elements.

DETAILED DESCRIPTION

Figure 1:
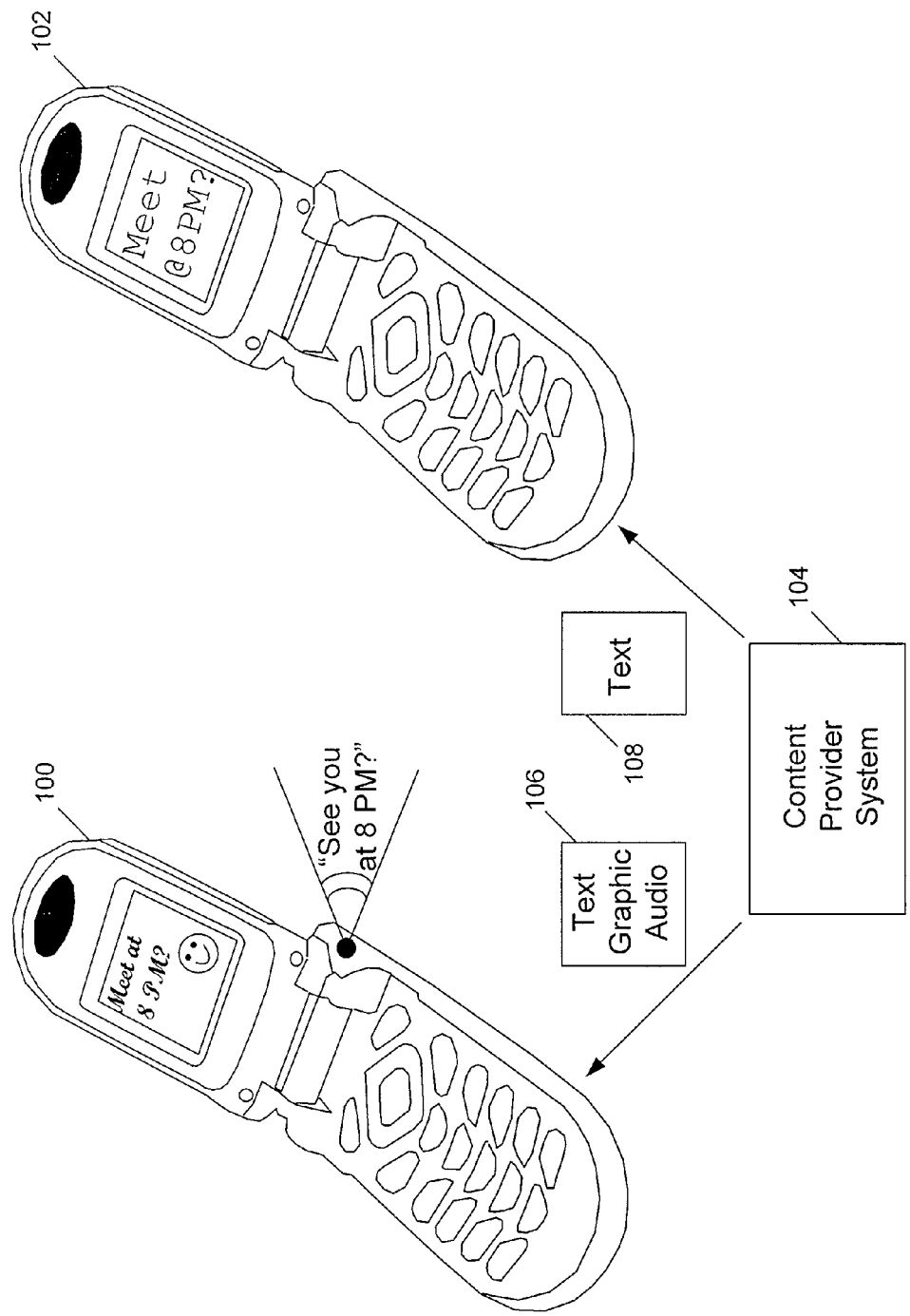
FIGS. 1 and 2 illustrates an exemplary content distribution system.

Referring to FIG. 1, content is illustrated as being provided to two electronic devices 100, 102 from a content provider system 104. In this particular scenario, both electronic devices 100, 102 are cellular telephones (e.g., N73 model cellular telephones produced by Nokia Corporation of Helsinki, Finland), however, other types of electronic devices such as personal digital assistants (PDAs), media players (e.g., MPEG Layer 3 (MP3) players), electronic game consoles, set-top boxes, automobile and personal navigation systems, etc. individually or in combination may be used for exchanging content. Along with different models and styles, these electronic devices may be produced with various capabilities. For example, the electronic devices 100, 102 may provide various audio processing capabilities (e.g., encoding/decoding schemes, etc.), image and video processing capabilities (e.g., display size, display resolution, camera resolution, etc.), data communication capabilities (e.g., text messaging, web browsing, data transmission, data buffering, etc.), data storage capabilities (e.g., memory size, storage size, etc.) and the like.

In this illustration, electronic device 102 provides a lower level of display resolution compared to the electronic device 100. As such, textual information (e.g., text messages) and graphical information (e.g., graphic illustrations) can be rendered in a more fanciful nature on the electronic device 100 compared to the relatively sparse display capabilities of the electronic device 102 (which lacks the ability to render graphics in this illustration). Furthermore, the electronic device 100 includes a speaker capable of playing audible content (e.g., tones, messages, etc.).

The content provider system 104 is capable of recognizing the different capabilities of the electronic devices 100, 102 and provides the appropriate content to each device. For example, respective messages 106 and 108 may be sent from the content provider system to the electronic devices 100, 102 to that includes an invitation for each of the device users. Since the content provider system 104 recognizes the graphical and audio capabilities of the electronic device 100, the message 106 contains content (e.g., text, graphics, audio) to capitalize upon the capabilities of the device. In a similar manner, the content provider system recognizes the comparatively limited capabilities of the electronic device 102, and includes content (e.g., text) in the message 108 so that the device is provided the appropriate content (e.g., text) without needlessly sending content (e.g., graphics, audio) that is not usable by the device and thereby inefficiently consume message space and transmission bandwidth.

Content provided by the content provider system 104 may originate from various types of content sources. For example, services associated with current events (e.g., news, weather, economic services, etc.) and databases (e.g., music archives, etc.) may be content sources for the content provider system 104. In some arrangements, such services and databases are accessible through the Internet, however, other communication techniques and methodologies may also be used to connect to content sources. Other electronic devices may also service are content sources, for example, one electronic device (e.g., electronic device 100) may provide content (e.g., a message) to the content provider system 104 for delivery to one or more electronic devices (e.g., electronic device 102).

Figure 2:
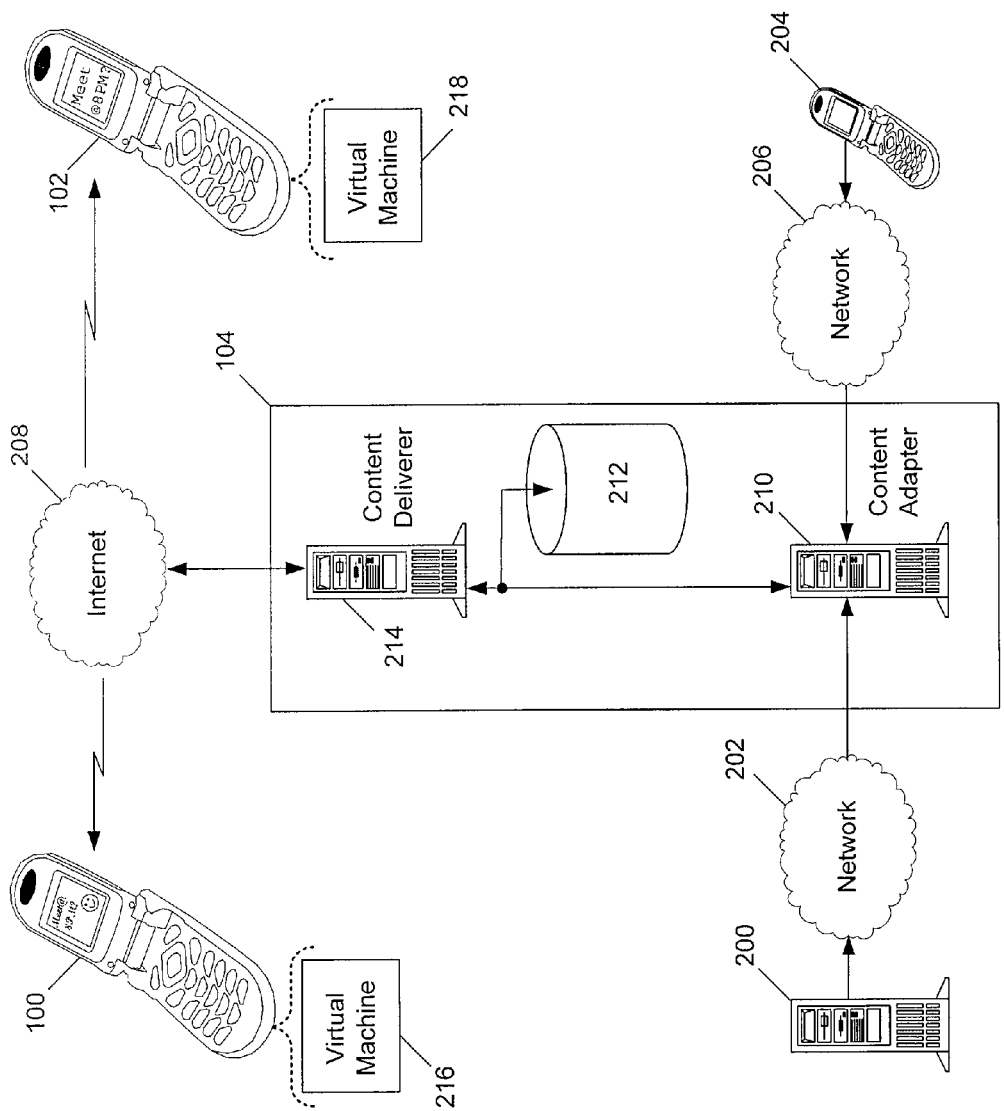

Referring to FIG. 2, along with collecting content and delivering content to appropriate electronic devices, the content provider system 104 also monitors the capabilities of devices (e.g., the electronic devices 100 and 102) along with the characteristics of the content being provided to the devices. As described below, by monitoring the devices and the content, the content provider system 104 may direct the appropriate type of content for delivery to one or more destination electronic devices. For example, appropriate type of content (based upon content provided by a content source) may be directed to an electronic device capable of receiving and processing the content. In this illustration, a server 200 may be one type of content source that stores content (e.g., news service information, archived music files, etc.) and is in communication with the content provider system 104 through a network 202 (e.g., a local area network (LAN), the Internet, etc.). In a similar fashion, other electronic devices (e.g., cellular telephones, PDA's, set-top boxes, electronic game consoles, etc.) such as an electronic device 204 may serve as content sources. Upon preparing the appropriate content, which may or may not be requested by a device user, the content provider system 104 may use the Internet 208 (or other type of network) for sending the appropriate content to the electronic devices 100 and 102. Along with servers and other electronic devices, content distribution and depositories systems (e.g., Internet websites, cable television systems, radio stations, etc.) along with other types of information systems may serve as content sources.

The content provider system 104 includes a content adapter 210 that prepares the content for delivery and monitors the characteristics of the content received from the content sources. The content adapter 210 may also transform content into various formats so that appropriate content may be provided to the one or more destination devices. For example, a content source (e.g., server 200) may provide an audio file (e.g., a WAV audio file) to the content provider system 104 for delivering to one or more devices. Along with storing the audio file in its original format (e.g., a WAV audio file), the content adapter 210 may also convert the file into one or more other formats (e.g., an MP3 audio file) so that the content may be provided to devices only capable of processing a format different from the original format. Similar to audio content, the content adapter 210 may convert other types of content such as text (e.g., unicode text to ASCII text), video and the like. By transforming the content into various formats, the appropriately formatted content may be efficiently provided to the desired destination device.

In this arrangement, the content provider system 104 includes a storage device 212 that is capable of storing different types of content (and content in different formats) provided by the content adapter 210. Various types of data storage techniques and methodologies may be implemented for storing content on the storage device 212. For example various compression and security (e.g., encryption) techniques may be implemented. Furthermore, along with using one storage device, content storage may be distributed across multiple types of similar or different storage devices (e.g., hard drives, CD-ROMs, a redundant array of independent disks (RAID), etc.).

The content provider system 104 also includes a content deliverer 214 that accesses the storage device 212 and delivers appropriate content to one or more electronic devices as directed (e.g., requested). In this implementation, the content deliverer 214 also monitors and tracks the capabilities of the electronic devices that may receive content. To monitor device capabilities, data representing device capabilities may be provided (to the content deliverer 214) in a message, data packet, etc. from each electronic device (e.g., electronic device 100) that establishes a connection with the content provider system 104. By grouping devices based upon similar or equivalent capabilities, the content deliverer 214 can efficiently determine which content format (or formats) is recognizable by a particular type of electronic device. Upon identifying the appropriate content format, the content deliverer 214 can retrieve and direct the appropriate content from the storage device 212 for delivery to the appropriate destination device or devices.

One or more types of device capabilities and content characteristics and may be monitored by the content provider system 104 for delivering content. For example, content characteristics such as video file formats (e.g., MJPEG, CCIR, MPEG-4, MPEG-2, MPEG-1, H.261, H.262, H.263, H.264, etc.), audio file formats (e.g., WAV, AIFF, AU, MP3 etc.), data file formats (e.g., text message formats, etc.), transmission parameters (e.g., transmission rate, sample rate, etc.), protocol compliance (e.g., TCP/IP, etc.), storage needs (e.g., file size, etc.) may be monitored. Similarly, device transmission and reception capabilities along with device storage and protocol compliance capabilities may be monitored by the content provider system 104 along with other types of device capabilities.

In this implementation, the content deliverer 214 executes operations for monitoring electronic device capabilities and the content adapter 210 monitors the content provided by the content sources and appropriately transforms the content into appropriate formats. However, in other implementations, one or more similar or different computing devices may be used separately or in combination with the content deliverer 214 and the content adapter 210 for operation execution. For example a series of local servers or remotely located servers may be used in concert with the content deliverer 214 and the content adapter 210. One or more electronic devices may also execute operations for assisting with device capability monitoring and content delivery. For example, the electronic devices 100 and 102 may execute applications and send and receive information using virtual machines 216, 218 respectively located at each device. Generally, the virtual machines 216, 218 may be considered multimedia and application players that execute applications written specifically for the virtual machines. For example, the virtual machines 216, 218 may be Adobe Flash™ Players or Adobe Flash Lite™ Players (a version of Adobe Flash Player for electronic devices such as cellular telephones) from Adobe Systems Incorporated, of San Jose, Calif. Virtual machines such as Adobe Flash™ and Adobe Flash Lite™ may implement vector and raster graphics, a script language and bidirectional streaming of video and audio. Other types of applications may also be used for monitoring and content exchange.

Virtual machines may also provide a virtualized abstract machine environment between a computing and its operating system. Applications for virtual machines are generally machine independent and the virtual machines may be single threaded or multi-threaded and may include one or more operating system processes. Typically, virtual machine applications are written in a high-level language, which is translated to a machine-independent byte code. The byte code may be converted to machine-specific instructions before or during execution of the application. Along with being executed by the electronic devices 100, 102, one or more virtual machines (e.g., an instance of Adobe Flash™ Player) may be executed by the content deliverer 214, the content adapter 210, and the content sources (e.g., server 200 and electronic device 204). Both of the virtual machines 216, 218 may be stored in a memory (e.g., random access memory (RAM), read-only memory (ROM), static RAM (SRAM), dynamic RAM (DRAM), etc.) and/or a storage device (e.g., a hard drive, CD-ROM, etc.) included in each of the electronic devices 100, 102 or another storage device (e.g., storage device 212) as needed.

Figure 3:
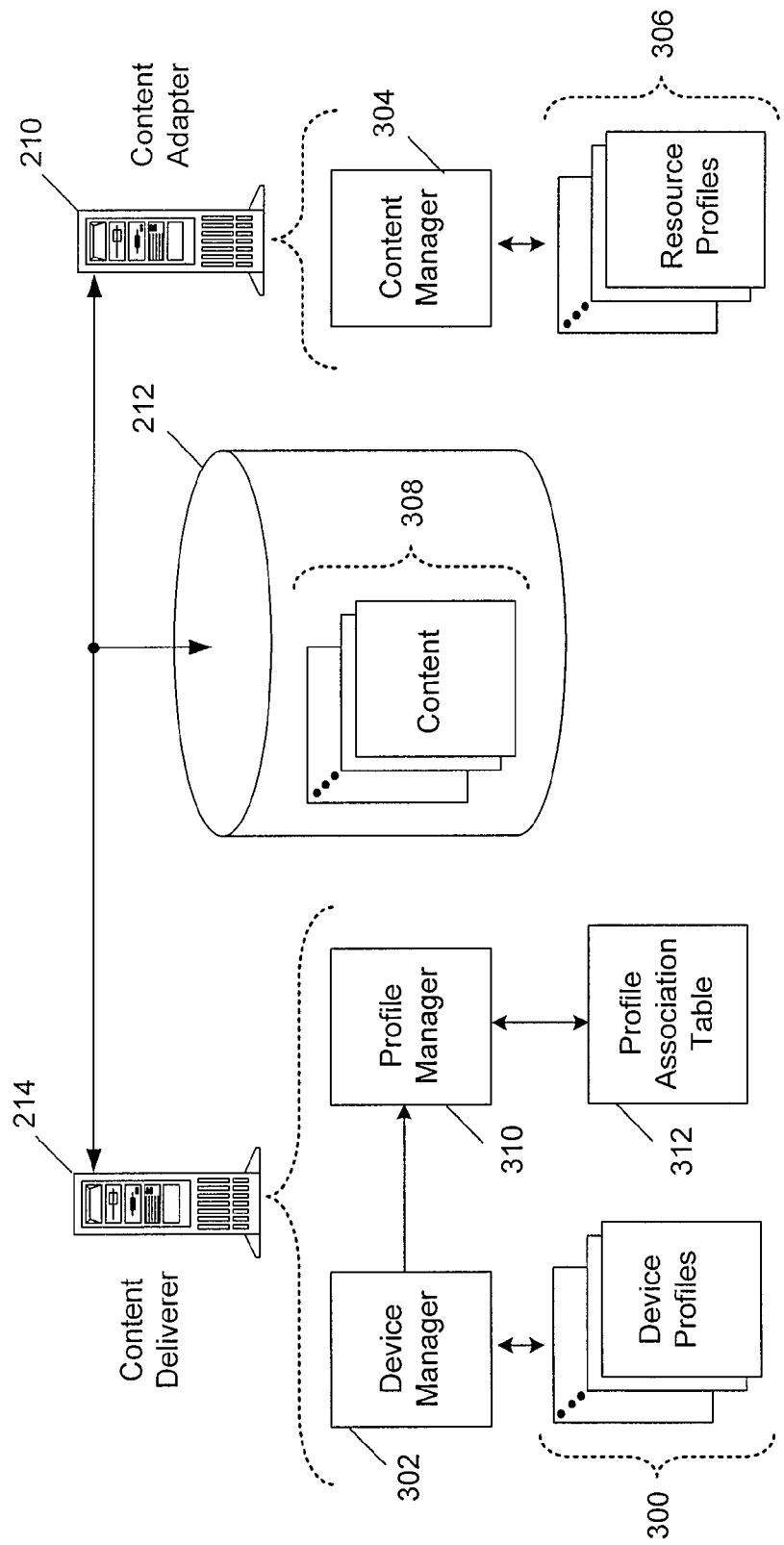
FIG. 3 illustrates an exemplary content adapter and content deliverer.

Referring to FIG. 3, one or more methodologies and techniques may be implemented to monitor device capabilities and content characteristics (e.g., for transforming content). For example, based upon information provided from devices and other information sources (e.g., manufacturers, etc.), devices with similar capabilities may be grouped so the content deliverer 214 can relatively quickly determine the appropriate type of content to deliver to the devices. In this arrangement, a device profile is produced to represent one or more capabilities associated with electronic devices such as data exchanging capabilities (e.g., achievable transmission rates, protocol compliance, etc.), data storage capabilities, (e.g., storage capacity, memory type, etc.), data presentation capabilities (e.g., video display resolution, audio decoding, etc.) and other types of capabilities. Device capabilities may be requested from the devices by to the content deliverer 214, or in some arrangements, capabilities may be provided from the devices in an unsolicited manner. One or more types of data structures such as data files, databases, etc. may be used by the content deliverer 214 for producing and storing device profiles that are easily retrievable and updateable. In this particular arrangement, a group of device profiles 300 are stored by the content deliverer 214 (e.g., in the storage unit 212), however, the profiles may also be stored in a distributed manner across multiple servers or other types of computing devices.

To create and use the device profiles 300, a device manager 302 is executed by the content deliverer 214. Along with collecting device capabilities to produce the device profiles, the device manager 302 also assigns devices to one or more device profiles based upon their capabilities. Additionally, the device manager 302 is capable of notifying a device which device profile or profiles have been assigned to it. For example, upon creating (or assigning) an appropriate device profile for a device, the device manager 302 may provide a device profile identifier to the device. Along with identifying the device profile, the device profile identifier may include a time stamp for updating the profile. For example, upon establishing a connection to the content deliverer 214, a device may provide a previously created device profile identifier (with a time stamp) to the device manager 302. By comparing the time stamp with information associated with a similar device profile included in the device profiles 300, the device manager 302 may determine if an updated device profile is present on the content deliverer 214 and initiate assigning the device to the updated device profile and providing a new device profile identifier (with a new time stamp) to the device.

In some arrangements, the device manager 302 also provides access and administrative operations for the device profiles 214. For example, as capability information is received from different types of electronic devices (or other sources), the device profile manager 302 may produce new device profiles (e.g., for new capabilities), update device profiles (e.g., to update device capabilities, etc.), delete device profiles (e.g., associated with obsolete device capabilities, etc.) and perform other profile operations (e.g., merge device profiles, etc.). In one scenario, a message may be provided by the electronic device 100 that includes identification information (e.g., brand, model number, etc.) associated with the device that may be used by the device profile manager 218 to determine the corresponding device capabilities (e.g., from manufacturer data, etc.) and update the association of the device with a device profile.

In a similar fashion, a content manager 304 is executed by the content adapter 210 for managing content from content sources (e.g., the server 200, electronic device 206, etc.) and preparing the content for delivery. Similar to device capabilities, content characteristics may also be grouped and stored, for example, in resource profiles 306 that are produced to represent one or more characteristics. For example, characteristics of audio content (e.g., compression format such as MP3, Advanced Audio Coding (AAC), etc.), video content (e.g., resolution, compression format, etc.), data content (e.g., textual formats, graphic formats, etc.) along with other types of content may be stored in one or more of the resource profiles 306. Other types of content characteristics may be associated with language type (e.g., English, German, French, etc.), data format and conventions (e.g., numerical format, date/time format, currency format, etc.) that may be based upon a user preference, an electronic device, etc. In this arrangement, the resource profiles 306 are also stored by the content adapter 202, however, similar to the device profiles 300, the resource profiles may be stored in a distributed manner across multiple computing devices. Also similar to the device manager 302, the content manager 304 execute operations such as profile creation, updating, deleting, and the like.

Along with associating content with resource profiles, the content manager 304 may transform content to form associations with other resource profiles or for creating new resource profiles. For example, content (e.g., a message) may be received from by the content adapter 210 from a source that includes audio (e.g., a WAV file) and textual content (e.g., Unicode). Based upon the format of the audio and textual content, one or more of the resource profiles 306 (e.g., a WAV resource profile and a Unicode resource profile) may be associated with the content. Correspondingly, the content manager 304 of may assign one resource profile (e.g., a WAV resource profile) to the audio content (e.g., the WAV file) and another resource profile (e.g., a Unicode resource profile) to the textual content. The content manager 304 may also convert to content and assign the converted content to others of the resource profiles 306. For example, the audio content (e.g., the WAV file) may be converted into another format (e.g., an MP3 file) by the content manager 304, while the textual content (e.g., the Unicode) may also be converted into another format (e.g., ASCII text) associated with another resource profile. By transforming the content and associating the transformed content with corresponding resource profiles, a variety of formatted content may be provided by the content adapter 210 to match the capabilities of different types of devices. For this example, content received by the content adapter 210 and content transformed by the content manager 304 is stored on the storage device 212 and illustrated as content 308. By matching capabilities of the device profiles 300 and the characteristics of the resource profiles 306, the appropriate portion of the content 308 may be accessed by the content deliverer 214 and sent to the one or more identified recipient devices.

In this implementation the content deliverer 214 executes a profile manager 310 that matches device capabilities to one or more of the device profiles 300. For example, upon establishing a connection between a device and the content deliverer 214, the profile manager 310 may match the capabilities of the device with one of the device profiles 300 (or may create a new device profile associated with the capabilities of the device). Upon identifying a device profile, the profile manager 310 next attempts to match the device profile to one or more of the resource profiles 306 in order to identify the appropriate content to be provided to the device. For example, for an electronic device capable of decoding and playing back audio content encoded in a particular format (e.g., MP3, AAC, etc.), the profile manager 310 may identify one of the device profiles 300 that is associated with the audio decoding capabilities of the device. Based upon the identified device profile, the profile manager 310 identifies the appropriate resource profile (included in the resource profiles 306) so that the appropriately encoded audio content is retrieved from the content 308 and provided to the device by the content deliverer 214.

In this arrangement, the profile manager forms associations between the device profiles 300 and the resource profiles 306 in order to match device capabilities and content characteristics. For example, device profile/resource profile associations may be produced by the profile manager 310 and stored in entries of a profile association table 312. By accessing the stored associations, the profile manager 310 may determine the type of content to be retrieved and send to a particular device. In some scenarios, an association between a resource profile and a device profile may have been previously determined by the profile manager 310, and thereby may be re-used when a similar situation occurs. Thus, the profile manager 310 may quickly assist with the preparation of content for delivery by recognizing similar situations that have previously occurred and have previously caused an entry to be stored in the profile association table 312. For situations in which a device profile has not been previously matched to one or more resource profiles, the profile manager 310 may search characteristics represented in each of the resource profiles 306 to identify one or more. By forming and using such device profile and resource profile associations, the content deliverer 214 may efficiently provide the appropriate content (stored and transformed by the content adapter 210) to the appropriate devices. Additionally, repetitive matching of device capabilities and content variants may be reduced.

Similar to the device manager 302 and the content manager 304, which may respectively change data in device profiles 300 and the resource profiles 306 in a dynamic manner, the profile manager 310 may monitor and dynamically adjust the entries of the profile associate table 312. For example, along with adding new profile association entries, entries may be deleted if, for example, a device capability or content characteristic becomes obsolete or is replaced. As device capabilities are updated, profile associations may correspondingly be updated or merged with other profile associations. For example if a particular cellular telephone model is updated for processing both MP3 and AAC audio content, the profile manager 310 may update one or more entries of the profile association table 312 to form appropriate device and content associations.

In this particular the implementation, operations of the device manager 302, the profile manager 310 and the content manager 304 are separately executed, however in some implementations, two or more of the managers may be combined along with their respective operation execution. Also, operation execution may be distributed to instances of the equivalent or different managers (not shown) within the content deliverer 214 and the content adapter 210.

Figure 4:
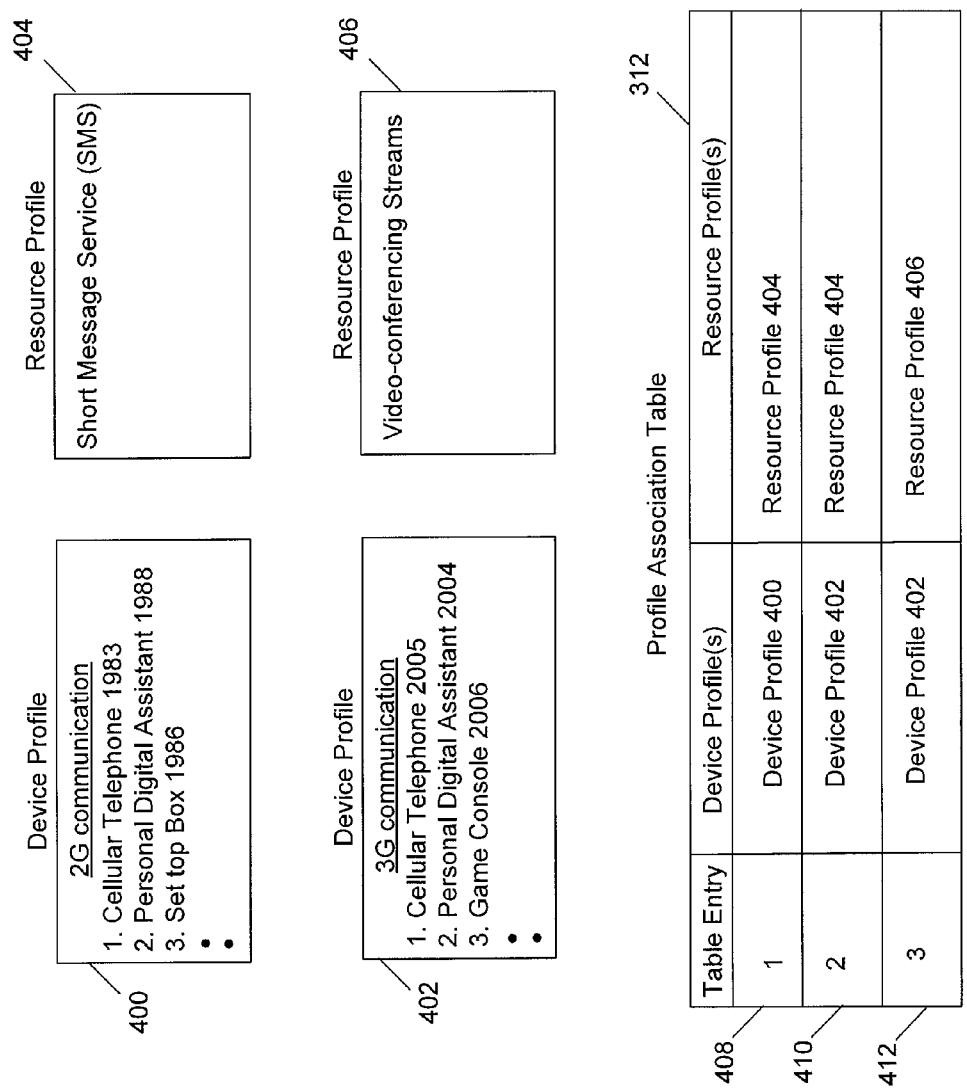
FIG. 4 illustrates example device profiles, example resource profiles and an example profile association table.

Referring to FIG. 4, two representative device profiles 400, 402 along with two representative resource profiles 404, 406 and a portion of the profile association table 312 are illustrated. As mentioned above, various types of information may be included in device and resource profiles. In this example, device profile 400 defines a group of devices that comply with second-generation mobile telephone protocols (referred to as 2G devices). Typically, such devices comply with wireless communication techniques such as Global System for Mobile communication (GSM), Time Division Multiple Access (TDMA), Code Division Multiple Access (CDMA), etc. While 2G devices typically support relatively high bit rate voice communications, only limited data communications is supported. For example, along with voice communications, 2G devices may only be capable of sending and storing text messages such as Short Message Service (SMS) messages (e.g., text messages that may include up to 160 characters). In this example, three types of devices (e.g., cellular telephone model 1983, personal digital assistant model 1988, set-top box model 1986) are listed in the device profile 400 as being capable of 2G communication.

The device profile 402 is associated with devices that comply with third-generation (3G) mobile telephony protocols that support higher data rates, compared to 2G devices, and are intended for bandwidth intensive applications such as rendering full-motion video and video-conferencing (in conjunction with voice and text messaging applications). In this example, three types of devices (e.g., cellular telephone model 2005, personal digital assistant 2004, video game console 2006) are listed in the device profile 402 as being capable of 3G communications.

In this illustration, the resource profile 406 provides characteristics for streaming video-conferences, which may supported by 3G capable devices such as the devices associated with device profile 402 (but not 2G capable devices). The resource profile 404 provides characteristics, in this example, of SMS messaging, which may be supported by both 2G (provided by the device profile 400) and 3G devices (provided by the device profile 402).

Based upon the device profiles 400, 402 and the resource profiles 404, 406, the profile manager 310 may determine one or more associations among the device capabilities and the content characteristics and add entries into the profile association table 312 to represent the associations. For example, for content (e.g., SMS messages) that may be characterized by the resource profile 404, appropriate destination devices capable of receiving this type of content include the 2G devices represented in the device profile 400 and the 3G devices represented in the device profile 402. As such, a first entry 408 and a second entry 410 of the profile association table 312 respectively include both device profiles 400 and 402 being associated with the resource profile 404 (since devices of both device profiles are capable of processing the content characterized by the resource profile 404). Similarly, a third entry 412 is added to the profile association table 312 that represents an association between the device profile 402 and the resource profile 406 (since devices associated with the device profile 400 are incapable of processing the video-conferencing content characterized by the resource profile 406).

As mentioned above, along with the device profiles 400, 402 and the resource profiles 404, 406 being respectively altered by the device manager 302 and the content manager 304, the profile association table 312 may be adjusted by the profile manager 310. For example, along with adding entries to represent additional device profile/resource profile associations, entries may be deleted from the profile association table 312. Furthermore, individual entries may be edited to reflect changes with the device profiles and the resource profiles. For example, individual device profiles may be added and deleted to reflect changes in device capabilities. Similarly, resource profiles may be added and deleted. For example, if the video-conferencing characterized in resource profile 406 could be processed by the 2G communication devices represented in device profile 400, another entry would be added to the profile association table 312 to reflect an association between the device profile 400 and the resource profile 406.

Figure 4A:
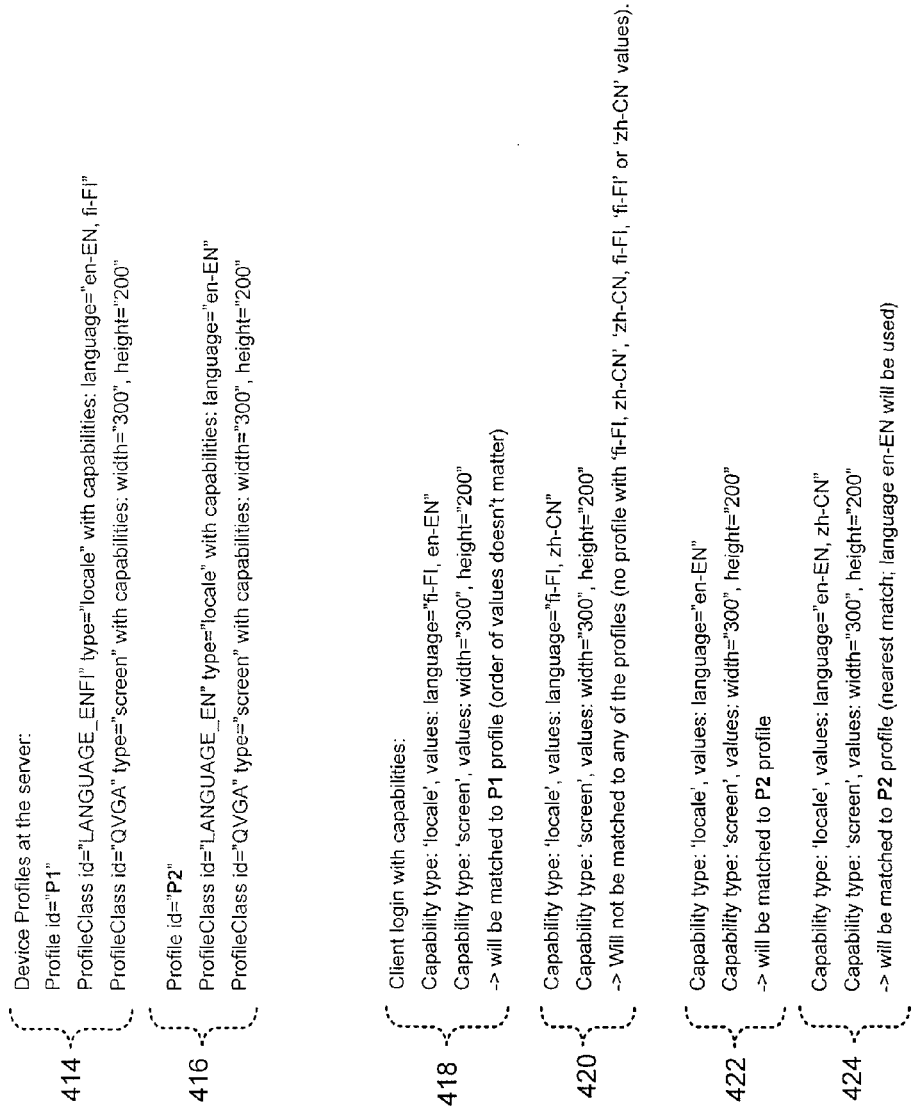

Referring to FIG. 4A, two exemplary device profiles 414 and 416 are illustrated in a pseudo-programming language. Each of the profiles 414 and 416 includes data representing three exemplary capabilities. In particular, capabilities associated with language are listed along with video capabilities and compatibility with a software application (e.g., Flash versions 7 and 8). A series of four sequences 418, 420, 422, 424 are also presented that represent four attempts to match to one of the two device profiles 414 and 416. In particular, the first sequence 418 demonstrates a scenario in which the device profile 414 is matched while the second sequence 420 demonstrates a failure to match device profile 414. Similarly, the third sequence 422 demonstrates matching the device profile 416 as does the fourth sequence 424 demonstrate a match the device profile 416.

Referring to FIG. 4B, matching a device profile to a resource profile is illustrated with the pseudo-programming language. Initially a first portion 426 is used to define one device profile and three resource profiles. Next, a portion of code 428 defines a test vector (referred as keys) for attempting a match. Portions of code 430 and 432 demonstrate that by stepping through the profiles, a match or a failure to match may be efficiently detected.

Figure 5:
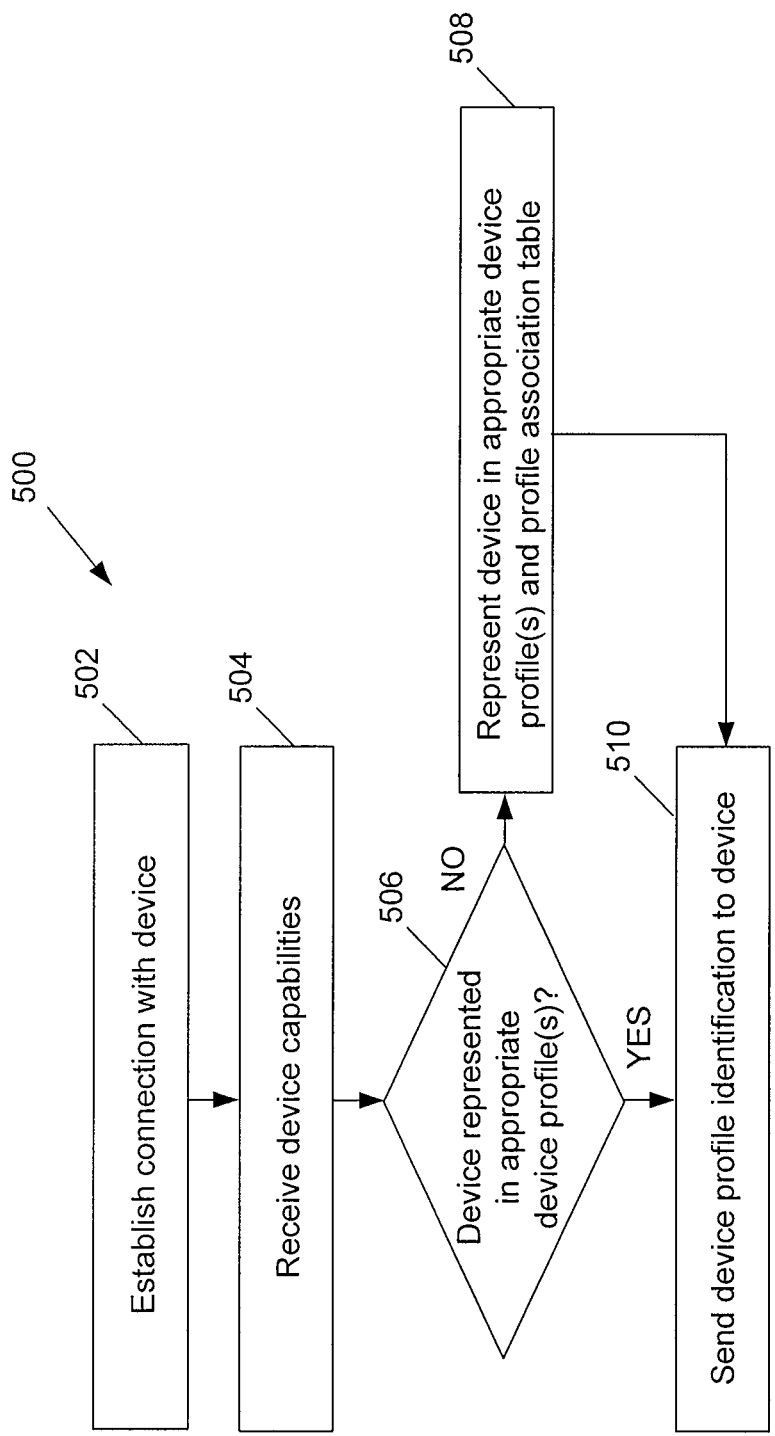
FIG. 5 is an example flow chart of operations of a device manager.

Referring to FIG. 5, a flowchart 500 represents operations of the device manager 302 (shown in FIG. 3). The operations may be executed by a single computing device (e.g., the content deliverer 214) or multiple computing devices. Along with being executed at a single site (e.g., at one computer system), operation execution may be distributed among two or more locations.

Operations may include establishing 502 a connection with a device. For example, a the content deliverer 214 may form a connection with a device for sending various types of content to the device. Operations also include receiving 504 data that represents the capabilities of the device. For example, the device may send a message to the content deliverer 214 that contains data representative of the capabilities of the device (e.g., transmission and reception capabilities, presentation and storage capabilities, etc.). Operations may also include determining 506 if the device is represented in one or more device profiles (e.g., the device profiles 300). For example, the device manager 302 may use one or more searching techniques and methodologies to identify if one or more device profiles are associated the capabilities of the device. Operations may also include representing 508 the device in one or more appropriate device profiles if not previously represented. Along with associating the device with previously produced device profiles, one or more device profiles may be created to represent the device capabilities. The device may also be represented in one or more entries of a profile association table (e.g., the profile association table 312). Once represented in one or more appropriate device profiles and profile association tables, operations of the device manager 302 may include sending 510 a device profile identification to the device such that the device is aware of the assigned device profile for future processing (e.g., updating of device profile).

Figure 6:
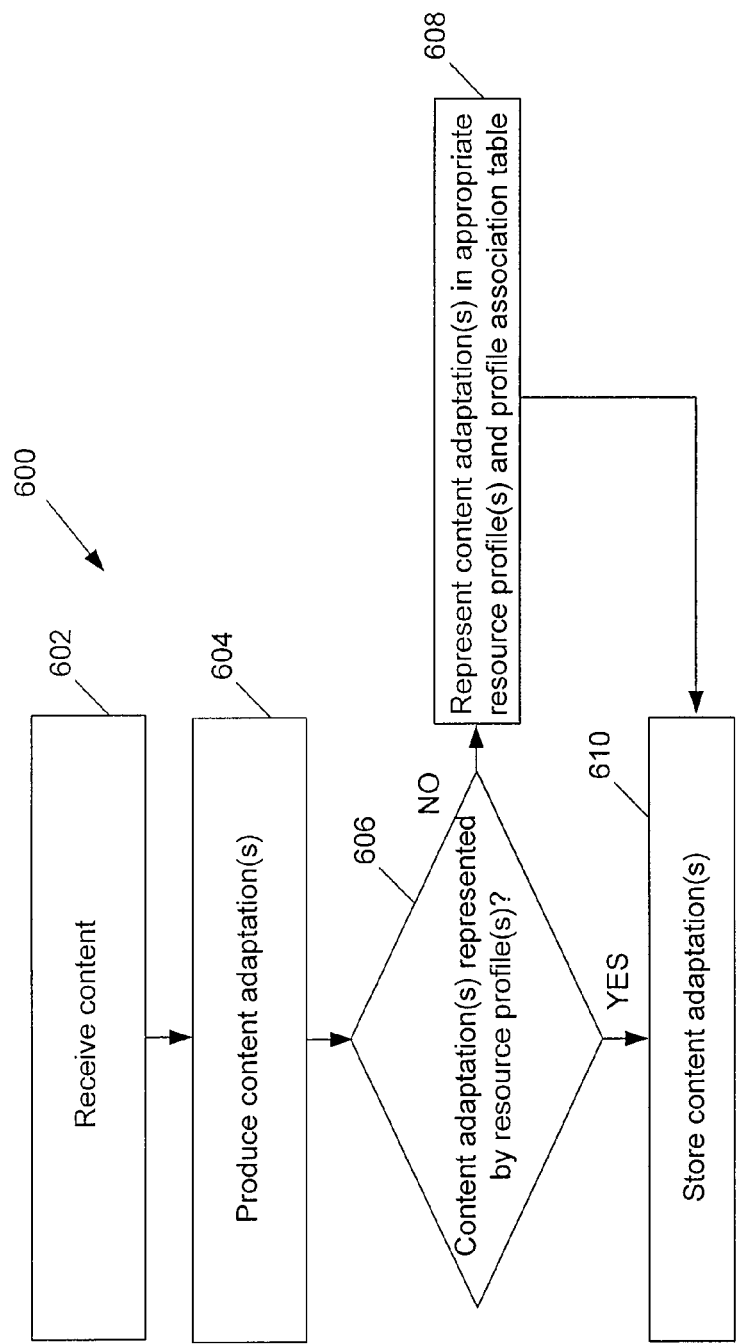
FIG. 6 is an example flow chart of operations of a content manager.

Referring to FIG. 6, a flowchart 500 represents operations of the content manager 304 (shown in FIG. 3). The operations may be executed by a single computing device (e.g., the content adapter 210) or multiple computing devices. Along with being executed at a single site (e.g., at one computer system), operation execution may be distributed among two or more locations.

Operations may include receiving 602 data that represents content (e.g., text, audio, video, etc.) and producing 604 one or more adaptations of the content. For example, content adaptations in various formats and that comply with different protocols may be produced. Operations may also include determining 606 if the characteristics of the content adaptations are represented by one or more resource profiles (e.g., the resource profiles 306). For example, the content manager 304 may use one or more searching techniques and methodologies to identify if one or more resource profiles (stored at the content adapter 210) represent (e.g., include similar content characteristics) the content adaptations. Operations may also include representing 608 the content adaptations in one or more appropriate resource profiles if not previously represented. Along with representing the content with previously produced resource profiles, one or more resource profiles may be created to represent the content characteristics. Also, the characteristics of the content adaptations may be represented in one or more entries of a profile association table (e.g., the profile association table 312). Once represented in one or more appropriate resource profiles and profile association tables, operations of the content manager 304 may include storing 610 the content adaptations in a storage device (e.g., in storage device 212) so that the content can be retrieved for delivery to one or more appropriate destinations such as electronics devices, etc.

Figure 7:
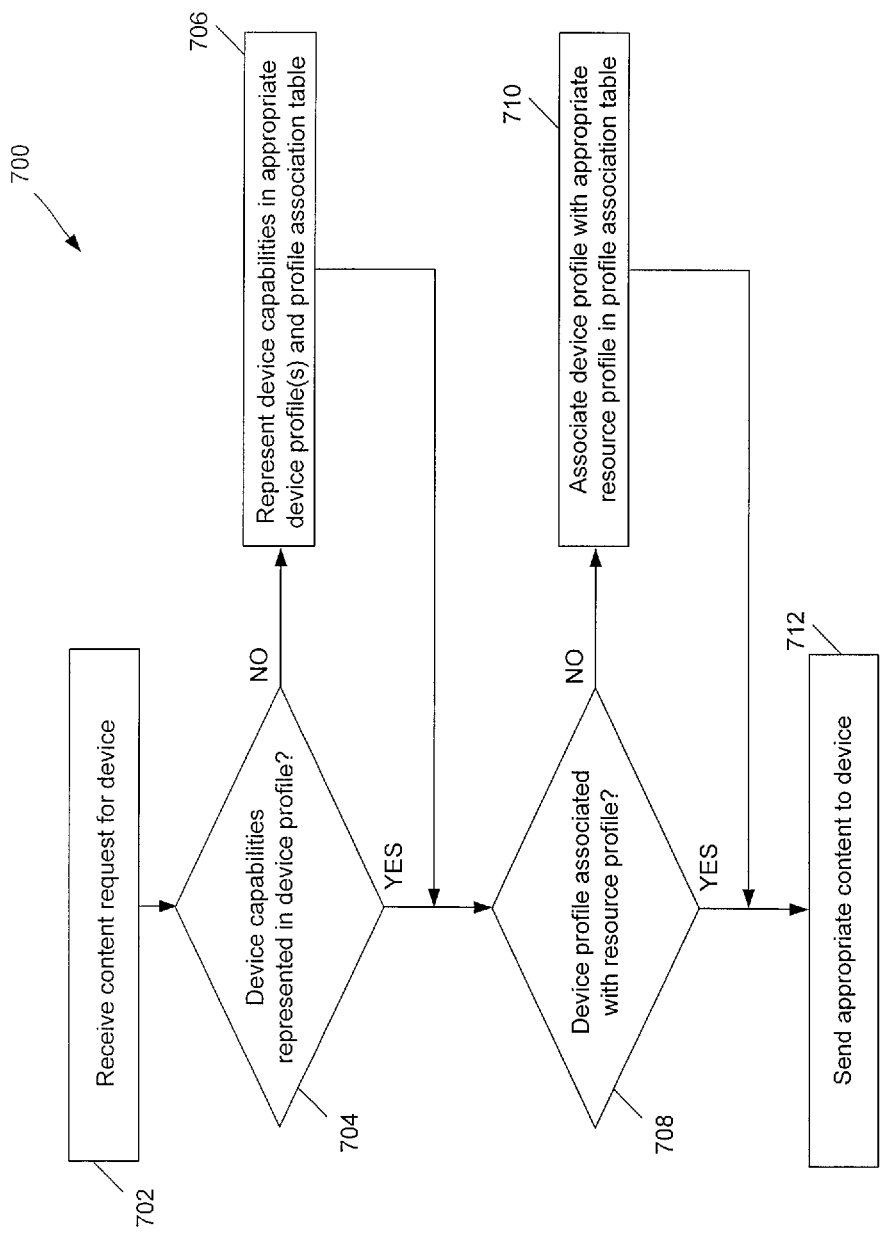
FIG. 7 is an example flow chart of operations of a profile manager.

Referring to FIG. 7, a flowchart 700 represents operations of the profile manager 310 (shown in FIG. 3). Similar to the device manager 302 and the content manager 304, operations of the profile manager 310 may be executed by a single computing device (e.g., the content deliverer) or multiple computing devices. Along with being executed at a single site (e.g., at one computer system), operation execution may be distributed among two or more locations.

The profile manager 310 may be used to match device capabilities to device profiles and device profiles to resource profiles (e.g., stored in the profile association table 312) to identify appropriate content (with characteristics compatible with the device capabilities) for delivery. Operations may include receiving 702 a request to provide content to a device. Such a request may be provided from the device or from another source (e.g., a content source such as another device). To determine the appropriate content (e.g., content adaptation), operations may include determining 704 if capabilities of the device are represented in a device profile. If the capabilities of the device are not represented, operations may include representing 706 the device capabilities in one or more appropriate device profiles. In some arrangements, a device manager (e.g., the device manager 302) may be called upon to assist in producing the device profile representations. Additionally, the device capabilities may be represented in a profile association table. Once the device capabilities are represented in one or more appropriate device profiles, operations may include determining 708 if the device profile is associated with a resource profile. For example, the device profile may be included in an entry of a profile association table for associating the device profile with a resource profile. If no association is present, operations may include associating 710 the device profile with one or more appropriate resource profiles, for example, in a profile association table. Once an association between the device profile and a resource profile is detected, operations of the profile manager 310 may include sending 712 the appropriate content (e.g., content adaptation) to the device based upon the device profile/resource profile association.

Figure 8:
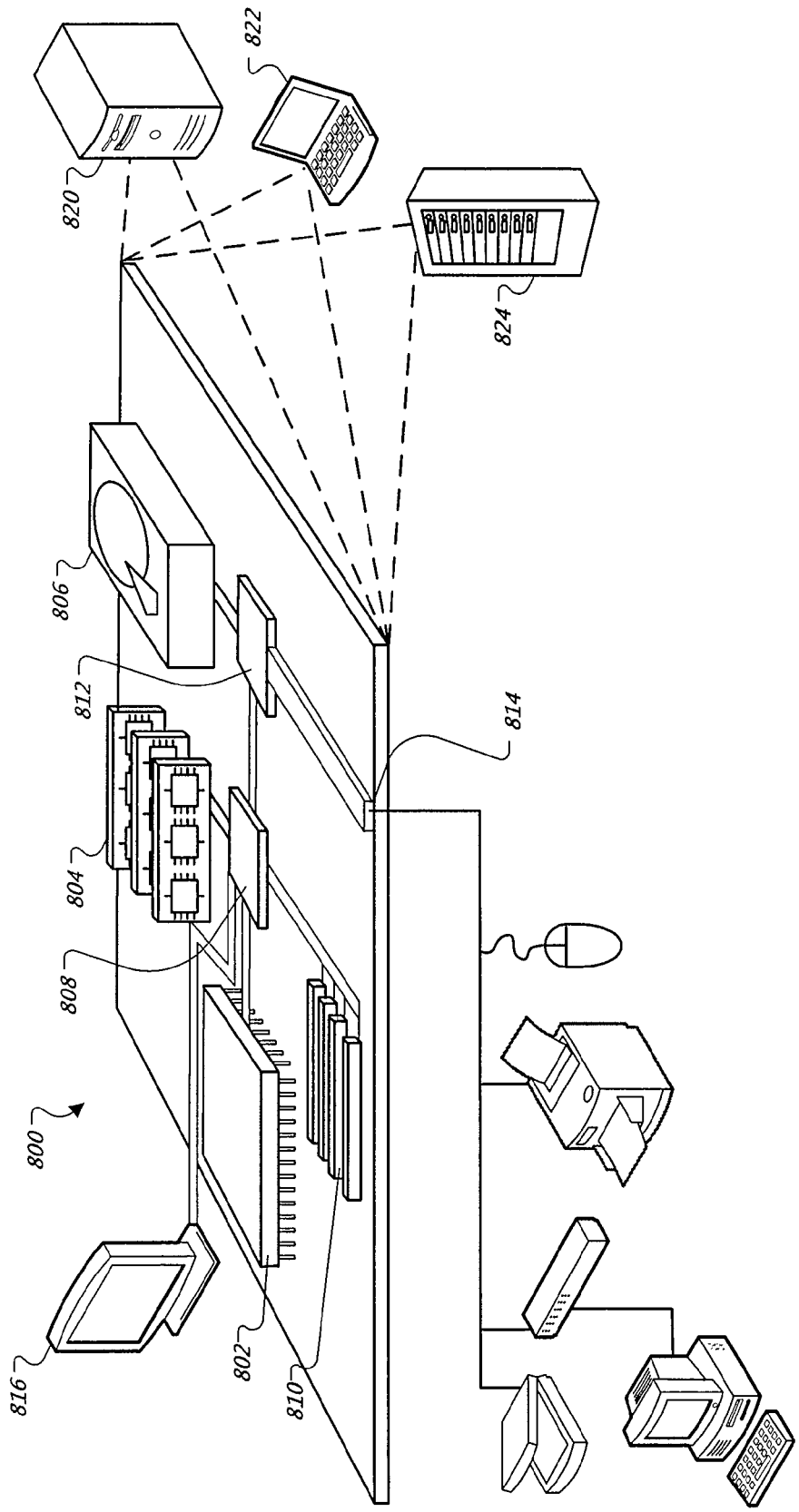
FIG. 8 is a block diagram of computing devices and systems.

FIG. 8 is a block diagram of computing systems 800 that may be used and implemented to perform operations associated with the device manager 302, the content manager 304 and the profile manager 310. Computing device 800 is intended to represent various forms of digital computers, such as laptops, desktops, workstations, personal digital assistants, servers, blade servers, mainframes, and other appropriate computers.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses can be used, as appropriate, along with multiple memories and types of memory. Also, multiple computing devices 800 can be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 807, display 816 (e.g., through a graphics processor or accelerator), and to high-speed expansion ports 810, which can accept various expansion cards (not shown). In the implementation, low-speed controller 812 is coupled to storage device 806 and low-speed expansion port 814. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. It can also be implemented as part of a rack server system 824. In addition, it can be implemented in a personal computer such as a laptop computer 822. Alternatively, components from computing device 800 can be combined with other components in a mobile device (not shown).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
in response to receiving content, determining if at least one electronic device capability represented in one of a plurality of updatable device profiles is associated with at least a first content characteristic represented in one of a plurality of resource profiles, wherein the one updateable device profile is assignable to at least another electronic device and wherein at least a second updatable device profile is assigned to the at least one electronic device;
assigning the one updatable device profile to the one resource profile if the electronic device capability is associated with the first content characteristic;
sending an identifiacation of the one updatable device profile to the at least another electronic device assigned to the one updatable device profile; and
upon receipt of content defined by the one resource profile, transforming at least a second content characteristic, different from the first content characteristic, into a third characteristic represented in the one resource profile to provide a formatted content, and
initiating delivery of the formatted content to at least one electronic device associated with the one updatable device profile based upon the assignment.

2. The computer-implemented method of claim 1, further comprising:
   storing data that represents the assignment of the one updatable device profile and the one resource profile.

3. The computer-implemented method of claim 2, further comprising:
   using the stored data to initiate content delivery.

4. The computer-implemented method of claim 2, further comprising:
   updating the stored data to adjust the assignment.

5. The computer-implemented method of claim 2, further comprising:
   deleting the stored data to remove the assignment.

6. The computer-implemented method of claim 1, in which determining if the electronic device capability is associated to the first content characteristic includes determining if the first content characteristic is compatible with the electronic device capability.

7. The computer-implemented method of claim 6, wherein the electronic device capability includes a video capability.

8. The computer-implemented method of claim 6, wherein the electronic device capability includes an audio capability.

9. The computer-implemented method of claim 6, wherein the electronic device capability includes a communication capability.

10. A system comprising:
    a computing device comprising:
        a profile manager for determining, in response to receiving content, if at least one electronic device capability represented in one of a plurality of updatable device profiles is associated with at least a first content characteristic represented in one of a plurality of resource profiles, wherein the one updateable device profile is assignable to at least another electronic device and wherein at least a second updatable device profile is assigned to the at least one electronic device, the profile manager is configured to assign the one updatable device profile to the one resource profile if the electronic device capability is associated with the first content characteristic, and to send an identification of the one updatable device profile to the at least another electronic device assigned to the one updatable device profile,
        upon receipt of content defined by the one resource profile the profile manager is configured to:
            transform at least a second content characteristic, different from the first content characteristic, into a third characteristic represented in the one resource profile to provide a formatted content, and
            initiate delivery of the formatted content to at least one electronic device associated with the one updatable device profile based upon the assignment.

11. The system of claim 10, further comprising:
    a device manager for producing the plurality of updatable device profiles.

12. The system of claim 10, further comprising:
    a content manager for producing the plurality of resource profiles.

13. The system of claim 10, further comprising:
    a profile association table for storing data that represents the assignment of the one updatable device profile to the one resource profile.

14. The system of claim 10, further comprising:
    a virtual machine for exchanging data representing the electronic device capability.

15. A computer program product, encoded on a non-transitory computer-readable medium, operable to cause data processing apparatus to perform operations comprising:
    in response to receiving content, determining if at least one electronic device capability represented in one of a plurality of updatable device profiles is associated with at least a first content characteristic represented in one of a plurality of resource profiles, wherein the one updateable device profile is assignable to at least another electronic device and wherein at least a second updatable device profile is assigned to the at least one electronic device;
    assigning the one updatable device profile to the one resource profile if the electronic device capability is associated with the first content characteristic;
    sending an identification of the one updatable device profile to the least another electronic device assigned to the one updatable device profile; and
    upon receipt of content defined by the one resource profile,
        transforming at least a second content characteristic, different from the first content characteristic, into a third characteristic represented in the one resource profile to provide a formatted content, and
        initiating delivery of the formatted content to at least one electronic device associated with the one updatable device profile based upon the assignment.

16. The computer program product of claim 15, further operable to cause data processing apparatus to perform operations comprising:
    storing data that represents the assignment of the one updatable device profile and the one resource profile.

17. The computer program product of claim 16, further operable to cause data processing apparatus to perform operations comprising:
    using the stored data to initiate content delivery.

18. The computer program product of claim 16, further operable to cause data processing apparatus to perform operations comprising:
    updating the stored data to adjust the assignment.

19. The computer program product of claim 16, further operable to cause data processing apparatus to perform operations comprising:
    deleting the stored data to remove the assignment.

20. The computer program product of claim 15, in which determining if the electronic device capability is associated to the first content characteristic includes determining if the content characteristic is compatible with the electronic device capability.

21. The computer program product of claim 15, wherein the electronic device capability includes a video capability.

22. The computer program product of claim 15, wherein the electronic device capability includes an audio capability.

23. The computer program product of claim 15, wherein the electronic device capability includes a communication capability.

* * * * *